(12) United States Patent
Stoev et al.

(10) Patent No.: US 8,977,866 B2
(45) Date of Patent: Mar. 10, 2015

(54) SECURITY MECHANISM FOR INCREASED PERSONAL DATA PROTECTION

(75) Inventors: Orlin Vesselinov Stoev, Toronto (CA); Eric Chan, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 506 days.

(21) Appl. No.: 12/823,641

(22) Filed: Jun. 25, 2010

(65) Prior Publication Data
US 2011/0321153 A1  Dec. 29, 2011

(51) Int. Cl.
G06F 21/62 (2013.01)

(52) U.S. Cl.
CPC ............ G06F 21/6218 (2013.01); *G06F 21/62* (2013.01); *G06F 21/6245* (2013.01); *G06F 2221/2141* (2013.01)
USPC ............. 713/193; 713/165; 713/189; 726/26; 726/27; 726/28

(58) Field of Classification Search
CPC ......... G06F 21/44; G06F 21/60; G06F 21/70; G06F 21/71; G06F 21/74; G06F 2221/2149
See application file for complete search history.

(56) References Cited

U.S. PATENT DOCUMENTS

| | | | |
|---|---|---|---|
| 2003/0097596 A1 | 5/2003 | Muratov et al. | |
| 2006/0105743 A1 | 5/2006 | Bocking et al. | |
| 2007/0016958 A1* | 1/2007 | Bodepudi et al. | 726/27 |
| 2007/0180492 A1 | 8/2007 | Hassan et al. | |
| 2010/0198728 A1* | 8/2010 | Aabye et al. | 705/44 |
| 2010/0257490 A1* | 10/2010 | Lyon et al. | 715/863 |
| 2012/0042396 A1* | 2/2012 | Guerra et al. | 726/30 |

OTHER PUBLICATIONS

"Ascendo Data Vault—Password Manager for BlackBerry", http://web.archive.org/web/20071205121917/http://www.ascendo-inc.com/DataVaultFAQ.html, Nov. 13, 2007 (Retrieved Apr. 9, 2013).*
"European Application Serial No. 10167427.3, European Search Report mailed Nov. 12, 2010", 7 pgs.
"European Application Serial No. 10167427.3, Response filed Jan. 12, 2011 to EP Search Report mailed Nov. 12, 2010", 15 pgs.
"Application Serial No. 2,744,460, Response filed Feb. 27, 2014 to Office Action mailed Sep. 5, 2013", 11 pgs.
"Canadian Application Serial No. 2,744,460, Office Action mailed Sep. 5, 2013", 4 pgs.
"Canadian Application Serial No. 2,744,460, Office Action mailed Nov. 7, 2014", 5 pgs.

* cited by examiner

*Primary Examiner* — Alexander Lagor
(74) *Attorney, Agent, or Firm* — Schwegman Lundberg & Woessner, P.A.

(57) ABSTRACT

Apparatus, systems, and methods provide a mechanism to enhance the management of data security in a system for users of the systems. Various embodiments include apparatus and methods to manage security of data in an electronic system on an application-by-application basis. Managing security of data may include an apparatus, system, or method structured to determine that a status of a feature in the electronic device satisfies a specified criterion, and to automatically activate a portion of a security mechanism in the electronic device to lock down an application that is open in the electronic device after determining that the status has satisfied the specified criterion. Such application-by-application basis can be applied in addition to managing data security globally in the electronic system. Additional apparatus, systems, and methods are disclosed.

17 Claims, 4 Drawing Sheets

SECURITY MECHANISM FOR INCREASED PERSONAL DATA PROTECTION

BACKGROUND

Individuals access and control information in electronic devices on a regular basis. Such information includes data that is of such a personal nature that individuals typically do not want this personal data easily accessible by unauthorized individuals or systems. Generally, such personal data can be managed in a secure manner. Improvements to the management of personal data can increase the protection of the personal data to enhance the security these electronic devices for individual users.

BRIEF DESCRIPTION OF THE DRAWINGS

Embodiments of the invention are illustrated by way of example and not limitation in the figures of the accompanying drawings in which.

DETAILED DESCRIPTION

Figure 1:
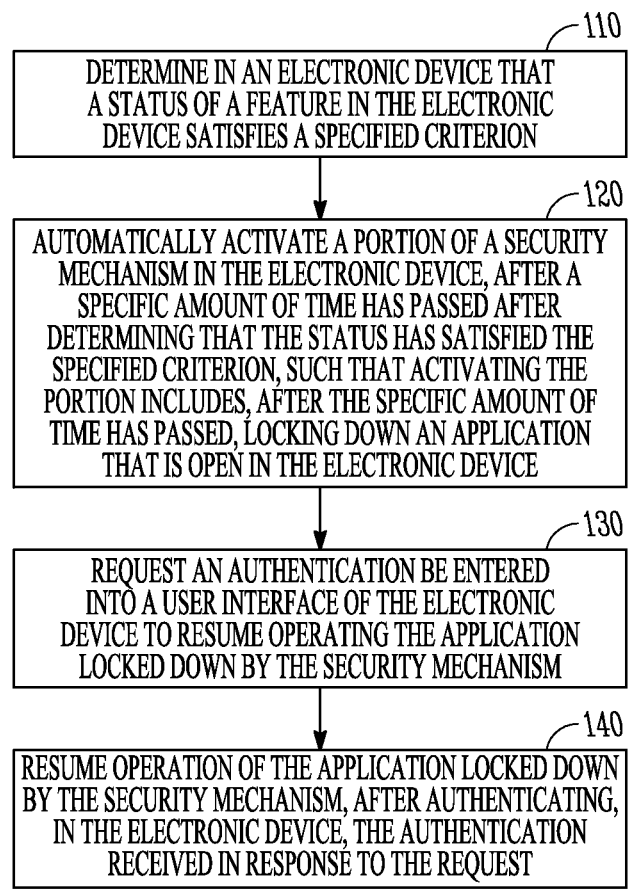
FIG. 1 shows features of an embodiment of a method of managing data in an electronic device, according to various embodiments.

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, systems, apparatus, and methods provide a security mechanism to enhance the management of data on the respective devices. The system or apparatus may be a relatively stationary system or a mobile system. An example of a stationary system is a desktop computer. An example of a mobile system is a mobile device, such as a laptop computer, a mobile wireless communications device, or other device conveniently carried by the device user. Systems and methods that manage or use data may be configured such that the management may be conducted with limited user interaction, and, in various embodiments, the system may perform essentially autonomously.

Systems that manage data or use data may include various apparatus, such as computer systems or other processing systems, having hardware, software, and/or hardware and software to manage and/or use data. In various embodiments, a personal computer (PC) can be used to manage or execute applications and associated data. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer.

In various embodiments, a mobile wireless communications device can be implemented to manage and/or execute applications that manage and/or use data. The mobile wireless communications devices may include, but are not limited to, mobile telephones, portable computers, PDAs, and other devices that may be conveniently carried by a user and provide wireless communication. Mobile telephones include wireless communications devices that have generally been referred to as cell phones. Mobile telephones may include a wide range of communication devices from portable phones with limited functionality beyond voice communication to portable phones capable of providing functionality of a personal computer, which portable phones may be referred to as smart phones.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

The instrumentality may operate to process, compute, calculate, determine, display, and/or conduct other activities correlated to processes of a machine, such as a computer system or similar electronic computing device, that manipulates and transforms data represented as physical (electronic) quantities within the machine's registers and memories into other data similarly represented as physical quantities within the machine memories or registers or other such information storage, transmission, or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a security mechanism in an apparatus, such as a mobile wireless communications device, provides protection of end user's personal data, such as credit card information, login credentials, and other personal data, that the user might enter into an application on the apparatus, such as a mobile wireless communications device. A possible security issue may arise when a user logs into an application in his mobile wireless communications device in which user data is decrypted for use, where the user subsequently leaves the mobile wireless communications device unattended such that the user data could be exposed and compromised. The security mechanism can be structured to address such security issues, among other security issues. In a non-limiting example, security mechanism can provide protection of the user's private information by monitoring a backlight of the mobile wireless communications device for an event to occur, such as the backlight turning on after being turned off, encrypting the data after 10 minutes, for example, of idle time in the monitoring of the backlight, and prompting the user to enter their authentication, when the backlight is turned back on after more than the 10 minutes of idle time. The authentication may be, but is not limited to, an application specific password.

It is not uncommon for a user of a mobile wireless communications device not to set a device password for the mobile wireless communications device. The security mechanism provides additional protection of the user information in an application in the mobile wireless communications device for a lost or an unobserved device, even if the user has not set a device password, since use of this application is based on an authentication for the application. In this manner, the security mechanism can be tied to user interface (UI) behavior rather than static time-out or user interaction alone. When the UI changes arbitrarily, for example in the case of a mobile wireless communications device when the backlight turns off, the security mechanism can be activated to conduct a number of operations after a certain period of time. Such a security mechanism does not depend only on user input (time elapsed after UT action) but also on UI behavior (the backlight being turned off by an operating system or other application). The security mechanism can operate on a single application that has stricter security requirements rather than operating on the whole device. The security mechanism can operate on multiple applications on an electronic device, such that the security mechanism can operate in an application-by-application manner, that has stricter security requirements for each of the perspective applications rather than operating on the whole device such as, but not limited to, a mobile wireless communications device.

FIG. 1 shows features of an embodiment of a method of managing data in an electronic device. At 110, a determination is made in an electronic device as to whether status of a feature in the electronic device satisfies a specified criterion. The specified criterion can be correlated to a status or event in the electronic device such that, if the status is attained or the event occurs, a possible security issue with respect to data accessible in the electronic device arises. For instance, in an electronic device arranged to process personal data via one or more applications running on the electronic device, with applications open or capable of being open without a security process and the electronic device unattended by a user, data on the electronic device may be accessible by unauthorized individuals or systems that can directly or indirectly take control of the applications that can operate in the electronic device along with data, including highly personal data, associated with these applications. In an example security process, the status of the feature can be monitored. Such a feature may be in a user interface of the electronic device. This feature may be under control of the operating system of the electronic device or other application that control operations in the electronic device. The status that is determined relative to a specified criterion can be the occurrence of inactivity in the feature for a set amount of time. Alternatively, the status that is determined relative to a specified criterion can be a determination that one or more specific applications are open and have remained idle for a set amount of time. Depending on the particular electronic device and various features on this electronic device, a feature and one or more corresponding criteria can be selected to provide a basis for the enhanced security process.

Within an electronic device, there can exist various features in which status changes or occurrences of an activity (or inactivity) can be used as an indication that the electronic device may be unattended. Various electronic devices include operation parameters that will automatically turn off features in the electronic device in response to inactivity over a length of time. This length of time is a parameter that can be stored in a memory location in the electronic device. This length of time may be set by a user of the electronic device via a user interface of the electronic device. If not set by the user, the electronic device can include a default length of time set by the manufacturer of the electronic device or other commercial entity that provides the electronic device to the user. For example, in an electronic device with a visual display as part of a user interface, an electronic device can have a lighting unit for viewing images on the display, where, if no activity occurs within the electronic device for a fixed period of time, the lighting unit is turned off. The occurrence of the lighting unit turning off may be associated with an unattended electronic device. The determination can be made in the electronic device as to whether status of the lighting unit in the electronic device satisfies the criterion that the lighting device has been turned off after having been placed in an on state. This determination can be made with the electronic device configured such that the off and on signals to the lightning unit are provided to a security mechanism in the electronic device. Alternatively, the lighting unit can be monitored to determine that is turned off from an on state. Such monitoring may be attained by monitoring an on-off status of the lighting unit that is stored as a parameter in the electronic device. The storage of the parameter may be a buffer, a register, a cache, a memory array, or other storage unit in the electronic device. Other monitoring mechanisms can be implemented, such as but not limited to, a light detection circuit to implement the security process.

At 120, a portion of a security mechanism in the electronic device is automatically activated, after a specific amount of time has passed after determining that the status has satisfied the specified criterion. The specific amount of time can be set in the electronic device by the user of the electronic device or as a default setting set by the provider of the electronic device. The specific amount of time can be set in a buffer, a register, a cache, a memory array, or other storage unit in the electronic device that can allow for the changing or programming of this specific amount of time. Alternatively, the specific amount of time may be hardwired in a timing circuit of the electronic device. With this specific amount of time programmable in the electronic device, the activation of the security mechanisms can be correlated to the user's pattern of activity on the electronic device. The specific amount of time can be set from immediate (0 minutes) upon determining that the status has satisfied the specified criterion to a number, N, of minutes after determining that the status has satisfied the specified criterion, where N may be any positive number. Activating the portion of the security mechanism includes, after the specific amount of time has passed, locking down an application that is open in the electronic device.

A security mechanism can include hardware, software, and/or combinations of hardware and software in the electronic device to cause operations to be executed in the electronic device to protect data from unauthorized access. By locking down an application that is open in the electronic device, it is meant that the application of the electronic device is not accessible to being controlled by another entity, which includes the application not being accessible via a user interface or via a communications interface, that the data of the application of the electronic device is not accessible, and that the open application and its associated data cannot be accessed visually or audibly in addition to restrictions on access through standard controls that use electrical, magnetic, or other machine based technologies. Locking down the application may include closing the application without saving data created or changed during the running of the application. Locking down the application may include closing the application and saving data created or changed during the running of the application. Such data can be saved to a temporary data storage location in the electronic device. Locking down the application may include maintaining the application open at its current processing position while restricting all access to the application and data of the application. The restriction may include prohibiting any user-based access to application and its associated data, where limited access may be allowed to various portions of the security mechanism of the electronic device. The security mechanism can include instrumentality encrypting data of the application when locking down the application in the activation of this portion of the security mechanism.

The locking down activities of the security mechanism can be performed on an application-by-application basis. Though the determination in the electronic device that a status of a feature in the electronic device satisfies a specified criterion may result in the electronic device performing global activities in response to the determination, the security mechanism can be structured to conduct security processes on individual application basis. The individual application basis can be directed to each application that is open when the determination is made that the status of the specified feature in the electronic device satisfies the specified criterion. Applications that are not open may effectively be in a lock down state. Further, the lock down activities of the security mechanism may be directed to one or more of a set of open applications but not all open applications. The lock down activities may be applied to only those applications that deal with personal data. The identification of these applications can be maintained in a memory system of the electronic device. In addition, different applications may be identified as being security related correlated to different features on which to base a criterion for applying the security mechanism to the respective application. Upon the determination in the electronic device that a status of a feature in the electronic device satisfies a specified criterion, only those applications identified as being a security related application undergo the security process. Alternatively, all applications may be subjected to various portions of the security mechanism when the selected feature or event meets the specified criteria correlated to a possible security issue.

The lock down activities may be directed to individual items of data. These individual items of data can be tagged in a memory system of the electronic data to be secure data items. With the activation of the security mechanism, the secure data items in any open application can be encrypted. Additionally, any activity directed to these data items can be prohibited. Such activities can include, but are not limited to, transmission of these data items. This process provides an alternate version of the application-by application security mechanism.

At 130, a request that an authentication be entered into a user interface of the electronic device is generated. The request is made to resume operating the application locked down by the security mechanism as an open application. Once a security issue passes, such as the electronic device no longer being unattended as exhibited by signals being received by activation in the user interface of the electronic device, the locked down application can be accessed by a user with appropriate authorization. The request that an authentication be entered in the user interface can be generated automatically after the status of the feature no longer satisfies the specified criterion. The authentication can be realized using one or more of a number of different mechanisms such as, but not limited to, an application specific password, finger prints, a retina image, or other characteristics unique to a specific user. The electronic representation of the authentication mechanism of an authorized user can be stored in the electronic device as an authentication for the specific application locked down by the security mechanism.

The input of the authentication is different from input of a password for globally operating the electronic device. If the electronic device is placed in an idle condition under a circumstance that includes the attainment of the criterion for locking down an application by the security mechanism, the operating system of the electronic device or other application on the electronic device may generate a request for a password or a response to other operations to activate the electronic device from the idle condition. Upon activation from the idle condition, the request that an authentication be entered into a user interface of the electronic device is generated. This request is different from globally activating the electronic device. A user may use the same password or other authentication for the electronic device and for the specific application, which results in the same password mechanism being entered twice, first to activate the idle electronic device and second to unlock the locked down application. By the same password for different processes, it is meant that the password is a specific arrangement of selected characters that is common to the different processes as a password separately for the respective processes. Applications that are locked down by the security mechanism may typically be those applications that can only be opened in the electronic device by entering an authentication for the application in an appropriate user interface of the electronic device.

At 140, operation of the application locked down by the security mechanism is resumed after authenticating, in the electronic device, the authentication received in response to the request. The received authentication can be compared to the authentication for the application that resides in a specific memory location in the electronic device.

An electronic device that provides an application-by-application security mechanism in a manner similar to or identical to the process discussed with respect to FIG. 1 can be realized by a number of different embodiments of devices, apparatus, and/or systems. The electronic system can be realized as a computer system, a personal computer, a mobile device, a mobile wireless communications device, or other similar electronic apparatus on which applications are executed that process or otherwise manipulate data. The data may include personal data to which a security tag can be assigned. For example, a mobile wireless communications device can be structured as a smart phone that can execute a number of different applications. An example application may include a banking application that provides user with the capability to conduct on-line banking via his smart phone in which personal data is maintained in the banking application relative to banking information of the user. Numerous other applications can reside on the mobile wireless communications device in which these applications use or maintain sensitive, personal information.

Figure 2:
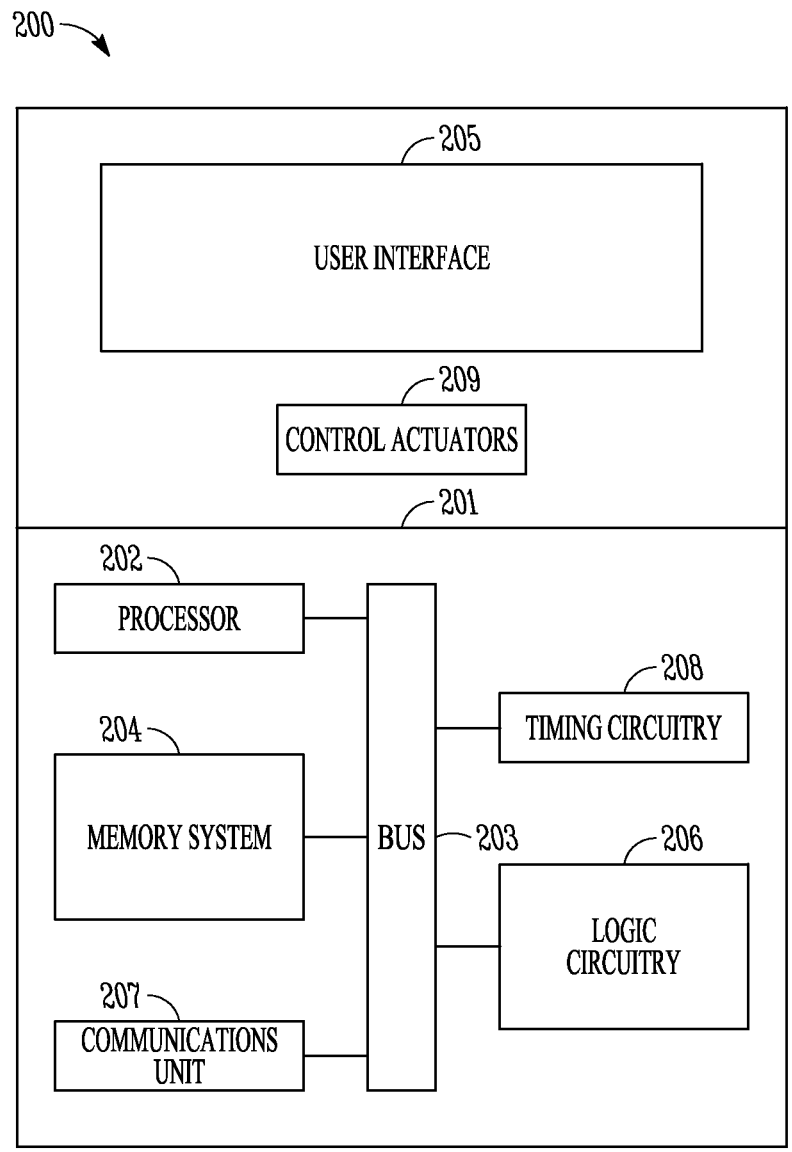
FIG. 2 shows a block diagram of features of an example mobile wireless communications device having a security mechanism, according to various embodiments.

FIG. 2 shows a block diagram of features of an example mobile wireless communications device 200 having a security mechanism in accordance with various embodiments. The security mechanism may operate in a security process similar to or identical to the processes associated with FIGS. 1 and 3. Mobile wireless communications device 200 is a system that be viewed as having two main sections. The first section is a section is accessible by a user of mobile wireless communications device 200. The first section includes, but is not limited to, a user interface 205 and control actuators 209. User interface 205 may include a visual display that allows the user to view images provided by an application running on mobile wireless communications device 200. User interface 205 can include a display having different lighting conditions from a lighting device for the display. User interface 205 can also in include audio capability to provide sound associated with the application running on the mobile wireless communications device 200 and standard sound devices that operate as conventional phone units such as for private conversations and for speaker phone based conversations. Control actuators 209 can include a number of actuators that are devices that can be manipulated by a user to control units of and/or enter data into mobile wireless communications device 200, such as for phone operations on mobile wireless communications device 200 or for operating an application running on mobile wireless communications device 200. Control actuators 209 can include a keyboard such as a qwerty keyboard. A keyboard can be provided via a visual display with user interface 205 structured to include a touch screen.

The second section for mobile wireless communications device 200 includes components of mobile wireless communications device 200 that operate with the user-based components of the first section. Typically, the components for the second section are not directly accessed by the user of mobile wireless communications device 200. Different structures can be used to separate the components of the first section and the second section. Demarcation 201 can be realized by housing structures that separate user-based components, such as control actuators 209 and user interface 206, from the components of the second section, but provide access between the first section and the second section, such that signals can be transferred among the components of the two sections.

In the second section, mobile wireless communications device 200 can include a processor 202, a memory system 204, and a bus 203, where processor 202 and memory system 204 are operably coupled via bus 203. Processor 202 may include one or more processing units or may include one or more multiple-core processing units. Memory system 204 can include data storage locations to store parameters to operate the system. The parameters may include various parameters to operate mobile wireless communications device 200 as a communications device. The parameters may include various parameters to operate a security mechanism in mobile wireless communications device 200. Memory system 204 can include one or more forms of data storage. Examples of such forms includes, but are not limited to, buffers, registers, a caches, memory arrays, memory devices, or other storage units arranged in mobile wireless communications device 200. Memory system 204 can include removable storage and non-removable storage, which may be in the form of volatile memory, non-volatile memory, or combinations thereof. Memory system 204 may include random access memory (RAM), read only memory (ROM), erasable programmable read-only memory (EPROM), electrically erasable programmable read-only memory (EEPROM), flash memory, other memory technologies, or any other medium capable of storing machine-readable instructions and data directed to execution in mobile wireless communications device 200.

Mobile wireless communications device 200 typically operates in a networked environment using communication unit 207 that is operable to connect to one or more networks. Communication unit 207 may provide connection to various network types that may include a wireless telephone network, a Local Area Network (LAN), a Wide Area Network (WAN), the Internet, a proprietary subscription-based network, or other networks. In addition to having instrumentality to connect to wireless WANs, communication unit 207 can also include instrumentality to establish communication connections via a local wireless communication mechanism such as, but not limited to, infrared communication, Wi-Fi communication, Bluetooth communication, or other wireless-based communication vehicle. Communication unit 207 can also include instrumentality to establish communication connections via a wired-like communication mechanism such as, for example but not limited to, a USB (universal serial bus) cable. The communication sessions of mobile wireless communications device 200 with external entities can be conducted on a secured basis.

Mobile wireless communications device 200 can include timing circuitry 202. Timing circuitry 202 can include clocking units to provide various timing lengths associated with the security mechanism operable in mobile wireless communications device 200 on an application-by-application manner to provide enhanced security to each of these applications and data associated with each of these applications. In an embodiment, security mechanism can be realized with instructions in memory system 204 with the timing provided using system clocks of mobile wireless communications device 200 and/or signal timing signals in memory units of memory system 204.

Mobile wireless communications device 200 can include logic circuitry 206. Logic circuitry 206 can be operably coupled to memory system 204 and to timing circuitry 208 such that the logic circuitry is operable to generate a control signal in response to determining that a status of a feature in mobile wireless communications device 200 satisfies a specified criterion and to automatically activate a portion of the security mechanism in mobile wireless communications device 200, after a specific amount of time has passed in response to the control signal. Activating the portion of the security mechanism, after the specific amount of time has passed, can include locking down an application that is open in mobile wireless communications device 200. Logic circuitry 206 can also be arranged to generate a request to enter an authentication into user interface 205 of mobile wireless communications device 200 to resume operating the application locked down as an open application. The authentication for the security mechanism can be an application specific password for the application locked down. Other authentication mechanisms can be used including, but not limited to, finger prints, a retina image, or other characteristics unique to a specific user. Logic circuitry 206 can also be structured to resume operation of the locked down application after authenticating the authentication, received in response to the request, with a corresponding entry in memory system 204. The parameters to operate the security mechanism can be set in memory system 204 and in timing circuitry 208 in conjunction with logic circuitry 206. In various embodiments, memory system 205, logic circuitry 206, and timing circuitry 208 can be integrated such that instructions, stored in memory system 204 as a portion of a security mechanism of mobile wireless communications device 200, when executed by processor 2002, cause mobile wireless communications device 200 to perform operations similar to or identical to operations discussed with respect to FIGS. 1 and 3.

Figure 3:
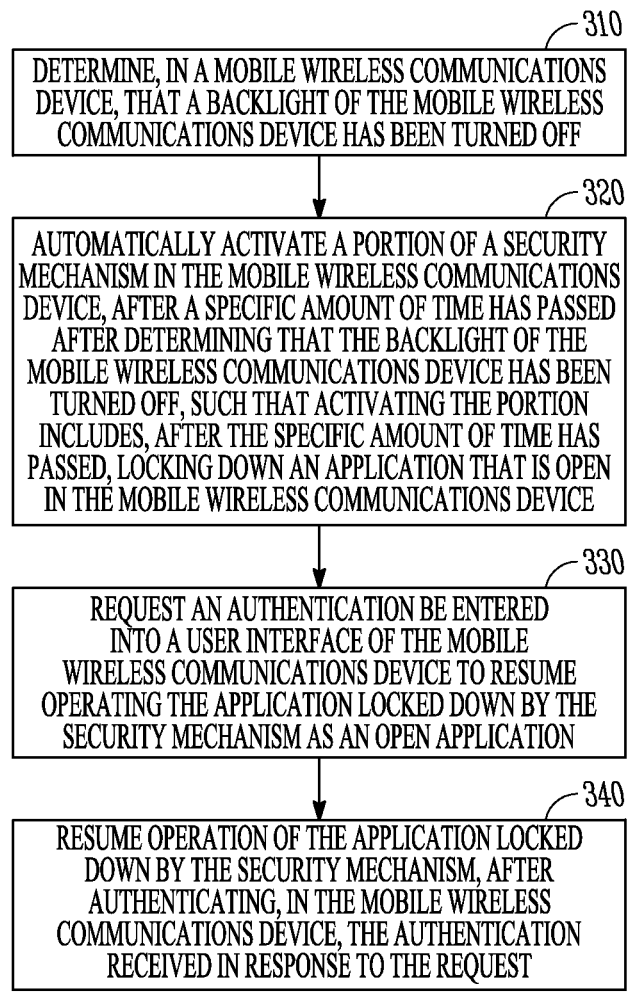
FIG. 3 shows features of an embodiment of a method of managing data in a mobile wireless communications device, according to various embodiments.

FIG. 3 shows features of an embodiment of a method of managing data in a mobile wireless communications device in accordance with various embodiments. At 310, a determination is made in a mobile wireless communications device that a backlight of the mobile wireless communications device has turned off. Other capabilities of a user interface of the mobile wireless communications device can be used as a feature whose status is determined relative to a specific criterion that can be correlated to a possible security issue. The security issue may relate to an application open on the mobile wireless communications device. In addition, inactivity for a specific length of time in a specific application open on mobile the wireless communications device can be used as a specified criterion. If inactivity in the specific application exceeds a threshold length of time, a possible a security issue related to the application open on mobile wireless communications device may be considered to exist.

At 320, a portion of a security mechanism is automatically activated in the mobile wireless communications device, after a specific amount of time has passed after determining that the backlight of the mobile wireless communications device has turned off. Activating the portion of the security mechanism, after the specific amount of time has passed, can include locking down an application that is open in the mobile wireless communications device. Locking down applications that are open in the mobile wireless communications device can include encrypting data of the open applications.

At 330, a request that an authentication be entered into a user interface of the mobile wireless communications device is generated. The request is made to resume operating the application locked down by the security mechanism as an open application. The authentication can be realized using one or more of a number of different mechanisms such as, but not limited to, an application specific password, finger prints, a retina image, or other characteristics unique to a specific user. The electronic representation of the authentication mechanism of an authorized user can be stored in the mobile wireless communications device as an authentication for the specific application locked down by the security mechanism. The request that the authentication be entered via the user interface of the can be generated after the backlight of the mobile wireless communications device is no longer turned off.

At 340, operation of the application locked down by the security mechanism resumes after authenticating, in the mobile wireless communications device, the authentication received in response to the request. The authentication received in response to the request can be compared to an electronic representation of the authentication stored in the memory system of the mobile wireless communications device. Operating the security mechanism of the mobile wireless communications device can include performing operations similar to or identical to operations with respect to FIG. 1.

Figure 4:
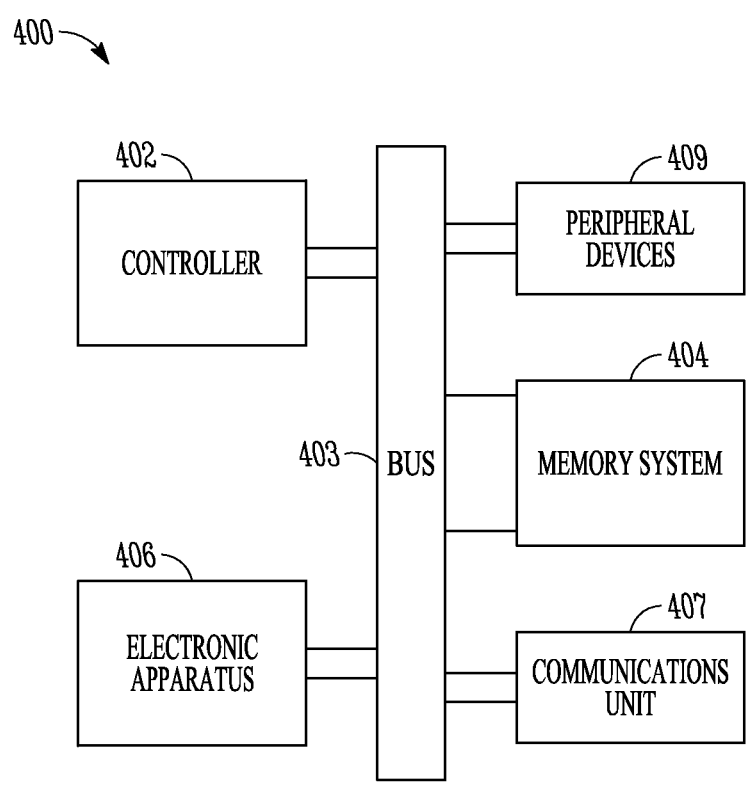
FIG. 4 is a functional block diagram of an example embodiment of a system having a security mechanism to manage data in the system, according to various embodiments.

FIG. 4 shows a diagram of an embodiment of a general architecture of a system 400 having a controller 402 and a memory system 404 that can be used to provide a security mechanism for management of data in the system. System 400 can also include electronic apparatus 406, communications unit 407, and a bus 403, where bus 403 provides electrical conductivity for transferal of signals and data among the components of system 400. In an embodiment, bus 403 includes an address bus, a data bus, and a control bus, each independently configured. In an alternative embodiment, bus 403 uses common conductive lines for providing one or more of address, data, or control, the use of which is regulated by controller 402. Bus 403 may be realized as multiple busses. Further, one or more peripheral devices 409 can be coupled to bus 403. Peripheral devices 409 can include one or more displays, additional storage memory system, lighting devices, and/or other control devices that may operate in conjunction with controller 402 and/or memory system 404. Controller 402 can be realized as one or more processors.

In an embodiment, system 400 can be arranged as a management system such that controller 402 and memory system 404 can be arranged to manage data through system 400 including providing a security mechanism for the data. The security mechanism can reside in system 400 in a manner similar to or identical to the security mechanisms associated with FIGS. 1-3. Electronic apparatus 406 can include additional components to operate as a management system. Electronic apparatus 406 can include additional components to operate system 400 in accordance with the design specifications for a particular system or apparatus.

Communications unit 407 can include one or more communications interfaces to operate over a wired network and/or a wireless network. The communications of system 400 with external entities can be conducted on a secured basis. Example interfaces can include a Wi-Fi interface, a USB interface, an Ethernet interface, an infrared interface, a Bluetooth interface, an interface to operate with a wireless service provider, and other appropriate communication interfaces. In an embodiment, system 400 can be realized as a PC. The PC may include instrumentality distributed throughout the PC to operate according to specific function to which the PC may be designed. System 400 arranged as a PC or other processing system/apparatus can operate according to any of the various embodiments discussed herein to manage applications and associated data in conjunction with a security mechanism residing on system 400. System 400 can be realized as a mobile wireless communications device.

Various embodiments or combination of embodiments for apparatus and methods for system 400 to manage applications and associated data in conjunction with a security mechanism residing on system 400, in a manner similar to or identical to examples as described herein, can be realized in hardware implementations, software implementations, and combinations of hardware and software implementations. These implementations may include a machine-readable medium having machine-executable instructions, such as a computer-readable medium having computer-executable instructions, for operating the system related to security issues that can be associated with one or more features in the system. The features can be correlated to portions of one or more user interfaces of the system or to one or more applications executable on the system. The machine-readable medium is not limited to any one type of medium. Machine-readable storage media may include, but are not limited to, solid-state memories, optical media, and magnetic media. Non-limiting examples of machine-readable storage media include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage media.

In various embodiments for system 400 arranged having a security mechanism, memory system 404 includes a machine-readable storage medium that stores instructions, which when executed by controller 402, cause system 400 to perform operations comprising: determining in system 400 that a status of a feature in system 400 satisfies a specified criterion; automatically activating a portion of a security mechanism in system 400, after a specific amount of time has passed after determining that the status has satisfied the specified criterion; requesting an authentication be entered into a user interface of system 400 to resume operating, as an open application, the application locked down by the security mechanism; and resuming operation of the application locked down by the security mechanism, after authenticating, in system 400, the authentication received in response to the request. The feature in system 400 for which it is determined that a status of the feature satisfies a specified criterion may be a feature of the user interface in system 400. Activating the portion, after the specific amount of time has passed, can include locking down an application that is open in system 400. The authentication can be realized using one or more of a number of different mechanisms such as, but not limited to, an application specific password, finger prints, a retina image, or other characteristics unique to a specific user. The electronic representation of the authentication mechanism of an authorized user can be stored in the system as an authentication for the specific application locked down by the security mechanism. Such instructions provide for operation of the security mechanism in system 400 on an application-by-application basis.

The instructions stored in the machine-readable storage medium can include instructions, which when executed by controller 402, cause system 400 to perform operations including monitoring the status of the feature, where the feature is a feature of a user interface of system 400. Determining that the status of the feature in system 400 satisfies a specified criterion can include determining inactivity in the feature for a set amount of time. Determining that the status of a feature in system 400 satisfies a specified criterion can include determining that an application open in the system has remained idle for a set amount of time. The instructions can include instructions to perform operations including encrypting data of an application when locking down the application in the activation of the portion of the security mechanism. Locking down an application can include maintaining the application at its current processing position while restricting all access to the application and data of the application. Requesting an authentication be entered can include requesting the authentication be entered automatically after the status of the feature no longer satisfies the specified criterion.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    determining in an electronic device, the electronic device being a mobile wireless communications device, that a status of a feature in the electronic device satisfies a specified criterion including determining that a backlight of the mobile wireless communications device turns off;
    automatically activating a portion of a security mechanism in the electronic device, after a specific amount of time has passed after determining that the status has satisfied the specified criterion, such that activating the portion includes, after the specific amount of time has passed, locking down an application that is open in the electronic device, locking down the application being on an application-by-application basis separate from operating on the whole electronic device, wherein locking down the application includes encrypting data of the application;
    requesting an authentication be entered, after the backlight of the mobile wireless communications device is no longer turned off, into a user interface of the electronic device to resume operating the application locked down by the security mechanism as an open application; and
    resuming operation of the application locked down by the security mechanism, after authenticating, in the electronic device, the authentication received in response to the request, the authentication being specific to the application locked down.

2. The method of claim 1, wherein the method includes monitoring the status of the feature, the feature being a feature of a user interface of the electronic device.

3. The method of claim 1, wherein determining that the status of a feature in the electronic device satisfies the specified criterion includes determining inactivity in the feature for a set amount of time.

4. The method of claim 1, wherein locking down the application includes maintaining the application at its current processing position while restricting all access to the application and data of the application.

5. The method of claim 1, wherein requesting the authentication be entered includes requesting the authentication be entered automatically after the status of the feature no longer satisfies the specified criterion.

6. The method of claim 1, wherein determining that the status of a feature in the electronic device satisfies the specified criterion includes determining that a status of a feature of the user interface in the electronic device satisfies a specified criterion.

7. The method of claim 1, wherein determining that the status of a feature in the electronic device satisfies the specified criterion includes determining that the application has remained idle for a set amount of time.

8. A non-transitory machine-readable storage medium having instructions stored thereon, which instructions, when executed by a processor, cause an electronic device to perform operations comprising:
    determining in the electronic device, the electronic device being a mobile wireless communications device, that a status of a feature in the electronic device satisfies a specified criterion including determining that a backlight of the mobile wireless communications device turns off;
    automatically activating a portion of a security mechanism in the electronic device, after a specific amount of time has passed after determining that the status has satisfied the specified criterion, such that activating the portion includes, after the specific amount of time has passed, locking down an application that is open in the electronic device, locking down the application being on an application-by-application basis separate from operating on the whole electronic device, wherein locking down the application includes encrypting data of the application;
    requesting an authentication be entered, after the backlight of the mobile wireless communications device is no longer turned off, into a user interface of the electronic device to resume operating the application locked down by the security mechanism as an open application; and
    resuming operation of the application locked down by the security mechanism, after authenticating, in the electronic device, the authentication received in response to the request, the authentication being specific to the application locked down.

9. The non-transitory machine-readable storage medium of claim 8, wherein the instructions includes instructions, which when executed by the processor, cause the electronic device to perform operations including monitoring the status of the feature, the feature being a feature of a user interface of the electronic device.

10. The non-transitory machine-readable storage medium of claim 8, wherein determining that the status of the feature in the electronic device satisfies the specified criterion includes determining inactivity in the feature for a set amount of time.

11. The non-transitory machine-readable storage medium of claim 8, wherein locking down the application includes maintaining the application at its current processing position while restricting all access to the application and data of the application.

12. The non-transitory machine-readable storage medium of claim 8, wherein requesting the authentication be entered includes requesting the authentication be entered automatically after the status of the feature no longer satisfies the specified criterion.

13. The non-transitory machine-readable storage medium of claim 8, wherein determining that the status of the feature in the electronic device satisfies the specified criterion includes determining that status of a feature of the user interface in an electronic device satisfies a specified criterion.

14. The non-transitory machine-readable storage medium of claim 8, wherein determining that the status of the feature in the electronic device satisfies the specified criterion includes determining that the application has remained idle for a set amount of time.

15. A system comprising:
   a mobile wireless communications device including:
      a processor;
      a memory system operably coupled to the processor, the memory system including data storage to store parameters to operate the system;
      timing circuitry; and
      logic circuitry operably coupled to the memory system and to the timing circuitry such that the logic circuitry is operable:
         to generate a control signal in response to determining that a status of a feature in the system satisfies a specified criterion including a determination that a backlight of the mobile wireless communications device turns off;
         to automatically activate a portion of a security mechanism in the system, after a specific amount of time has passed in response to the control signal, such that activating the portion includes, after the specific amount of time has passed, locking down an application that is open in the system, locking down the application being on an application-by-application basis separate from operating on the whole electronic device, wherein locking down the application includes encryption of data of the application;
         to generate a request to enter, after the backlight of the mobile wireless communications device is no longer turned off, an authentication into a user interface of the system to resume operating the application locked down by the security mechanism as an open application; and
         to resume operation of the application locked down after authenticating the authentication, received in response to the request, with a corresponding entry in the memory system, the authentication being specific to the application locked down.

16. The system of claim 15, wherein the memory system includes machine-readable storage medium having instructions stored thereon, such that the instructions, when executed by the processor, cause the system to perform operations comprising:
   determining in the system that the status of the feature in the system satisfies the specified criterion;
   automatically activating the portion of the security mechanism in the system, after the specific amount of time has passed after determining that the status has satisfied the specified criterion, such that activating the portion includes, after the specific amount of time has passed, locking down the application that is open in the system;
   requesting the authentication be entered into the user interface of the system to resume operating the application locked down by the security mechanism as an open application; and
   resuming operation of the application locked down by the security mechanism, after authenticating, in the system, the authentication received in response to the request, the authentication being specific to the application locked down.

17. The system of claim 15, wherein the mobile wireless communications device is a smart phone.

\* \* \* \* \*